Dec. 8, 1970   G. BIANCHI ET AL   3,545,277
DETECTING DIFFERENTIAL PRESSURE LEVELS
Filed Aug. 27, 1968   2 Sheets-Sheet 1

INVENTORS
GIANFRANCO BIANCHI
LUIGI MARUCCI
BY
*McGlew and Toren*
ATTORNEYS

United States Patent Office 3,545,277
Patented Dec. 8, 1970

3,545,277
DETECTING DIFFERENTIAL PRESSURE LEVELS
Gianfranco Bianchi and Luigi Marucci, Milan, Italy, assignors to Kent-Tieghi S.p.A., Milan, Italy
Filed Aug. 27, 1968, Ser. No. 755,540
Claims priority, application Italy, Sept. 8, 1967, 813,882
Int. Cl. G01l 7/16
U.S. Cl. 73—419        6 Claims

ABSTRACT OF THE DISCLOSURE

A system and device for detecting differences in the pressure level of two pneumatic signals, wherein two indicating elements are airtightly fitted freely movable within vertical sealed housings, to the ends of which the pneumatic signals are fed in respective opposite directions, in such a manner that a pneumatic force directly proportional to the difference between the pressure levels acts in respective opposite directions on the indicating elements. When a pneumatic force overcomes the gravity force, the element on which the pneumatic force acts upwardly is correspondingly lifted upwards and indicates an unbalanced condition of the pressure signals.

BACKGROUND

This invention concerns a system for the detection and indication of differences in the pressure level of two pneumatic signals, as well as an indicator by which the system is carried into practice.

In the field of pneumatic measuring instruments and pneumatic governors, there are known devices operable to detect pressure differences between two different signals, the devices being utilized generally to verify the adjustment of one of the signals in order to reduce the difference to zero.

Already known instruments usually utilize membrane or bellows devices, the two different pressures acting on two single detectors, each consisting e.g. of a membrane, that are operatively connected with a pointer, whereby to cause a deflection thereof on either sides of a middle "zero" position, such deflections thus being substantially proportional to the difference between the operating pressures.

However, it has been ascertained that such instruments can be advantageously utilized only when the values of applied pressures do not show large variations, since otherwise they lose their precision and thus their merits. In fact, since it is practically impossible to work the surface areas of the two detecting elements (membrane, bellows and the like) in such a manner as to be perfectly equal with each other, the pressure increases of one of said two signals will result in pointer deflections larger than those caused by a corresponding increase of the other signal. Even when both signals are exactly equal with each other, a pointer deflection proportional to the difference in the surface areas may occur, and the greater this difference the greater is the difference of the balanced or equal value of the two signals from the balanced or equal value to which the instrument has been calibrated.

Different compensation devices already have been designed in order to remove the above drawbacks. However, these devices render the instrument more complicated and thus also more expensive and of less practical utility.

SUMMARY

The main object of the invention is to obviate the above drawbacks by providing an indicator of the initially defined type, which operates on the basis of a novel and improved detection system, permitting indication of the equality of two pressures at any static level with a remarkable precision and independently of the values of the applied pressures, the sensitivity of the instrument depending only, and in all cases, on the difference in the applied pressures.

The above purposes are attained by an extremely simple, compact, rugged and small sized instrument.

In more detail, the system, according to the present invention, for the detection and indication of differences in the pressure level of two pneumatic signals, and in particular of the direction of such differences, is essentially characterized in that the indication is obtained by the detection of the position of at least two elements that are freely movable within preferably vertical closed housings, each of the elements being subjected to a force that is directly proportional to the difference in the pressure levels to be compared and that acts separately and in opposite directions on the elements, as well as to a force due to the weight of the element, and possibly also to the frictional force that is exerted thereon by the housing walls while the element in question is being moved therein.

The difference in the signal levels and the direction thereof are indicated by a detection of the element which is in a raised position in respect to a lower rest position both elements being in the rest position, owing to their respective weights, when the difference in the pressure levels is nil, while one of the elements is raised when the force resulting from the difference in the pressure levels acts thereon in a direction opposite to the gravity force and overcomes this latter.

The invention concerns also an indicator for carrying into practice the above described system and adapted in particular to point-out the optimum transfer position between two different operative control conditions of a pneumatic circuit, such position substantially coinciding with the balance condition of the signals. This indicator is characterized in that it comprises two substantially vertical, closed housings, in each of which an element is airtightly movable under the action of its own weight and of a force resulting from the pressure difference that is obtained by having one end of each housing connected with means feeding one of the pneumatic signals and the opposite end thereof with means feeding the other pneumatic signal, the connections being established in such a manner as to have the respective elements acted upon by the pressure difference in opposite directions.

The indicator substantially consists, according to a preferred embodiment thereof, of two sealed cylindric housings within each of which a vertically movable element, having preferably a spherical shape, is airtightly fitted, i.e. the element having a diametral section substantially equal to the clear width of its housing, each housing being fitted at the top or bottom thereof with pneumatic connection means through which the different pneumatic signals are alternately fed and with pneumatic means connecting the bottom or top thereof respectively with the top or bottom of the other housing.

In the operation of the indicator, the positions of the two spherical elements are visually, or magnetically, or otherwise detected. In particular, no difference in the pressures exists when both elements are in their rest position on the housing bottoms, while when one element is lifted an indication is given that a difference—positive or negative according to which of said two elements has been lifted—exists in the pressures. Thus, unlike the already known and previously mentioned instruments, the instrument according to the invention falls in the class of so called "zero instruments," being adapted to indicate the attainment or not of a balance condition and the direction in which one of the factors is to be modified for establishing the balance condition in case the same is not attained, without however stating the value or amount of the indicated unbalance as instead occurs by the pointer of already known instruments. However, such missing statement does not represent a disadvantage in the cases of practical application of the invention instrument, wherein only a check of the attained balance condition is usually required.

The abovestated and further features of the system and instrument according to the invention will be disclosed in more detail in the following description, taken with the accompanying drawings and referring to preferred embodiments and applications thereof, both description and drawings being given only as not restrictive examples.

DRAWINGS

FIG. 1 diagrammatically shows one of the heretofore known and practically utilized instruments.

FIG. 2 diagrammatically shows a pneumatic circuit embodying and utilizing an indicator according to the invention.

Figure 5:
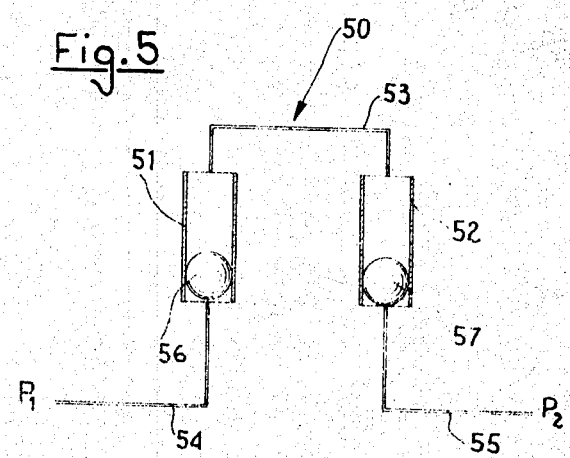

FIG. 5 diagrammatically shows a second embodiment of the indicator of the invention.

PREFERRED EMBODIMENTS

Figure 1:
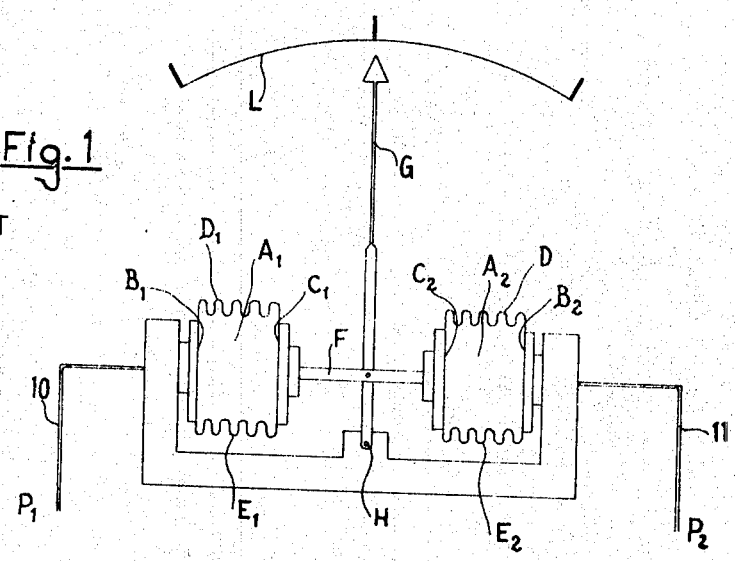

In order to better illustrate the features and advantages of the invention when compared with the indicators or instruments as heretofore utilized to perform the same results, a typical instrument as heretofore utilized for the detection of pressure differences is shown in FIG. 1. Such instrument comprises two feeding lines 10 and 11, through which the two pneumatic signals P1 and P2 are respectively fed to sensitive member thereof. Signals P1 and P2 are respectively fed to chambers A1 and A2 formed with the rigid walls B1, B2 and C1, C2 and with the deformable or bellows walls D1, D2 and E1, E2. Rigid walls C1, C2 are connected with each other by a rod F, which, in turn, is connected with the pointer G pivoted at H and movable across an indicating scale L. Thus, when the two signals P1, P2 differ from each other, the rod F and, consequently the pointer G, will be acted upon by a force that is directly proportional to the difference in the pressures, whereby the pointer is moved in the related direction. When the two signals P1, P2 are equal with each other, the rod F is acted upon by two equal and oppositely directed forces, whereby no movement of the pointer G occurs and a balance condition is indicated. However, such condition occurs only in the theoretical case wherein the surfaces C1, C2 have the same area, while in practice a movement of the pointer G from its middle position takes place and is proportional to the difference between the two surface areas and the greater the movement, the larger is the difference between the value of the two equal pressures P1, P2 and the pressure value wherein the instrument is calibrated. It is to be therefore understood that the accuracy of the instrument is acceptable only when both values P1 and P2 are within a sufficiently narrow tolerance in respect of the calibration value, while, in the contrary case, recourse must be made to adjusting devices by which the instrument is made highly complicated and expensive.

Figure 2:
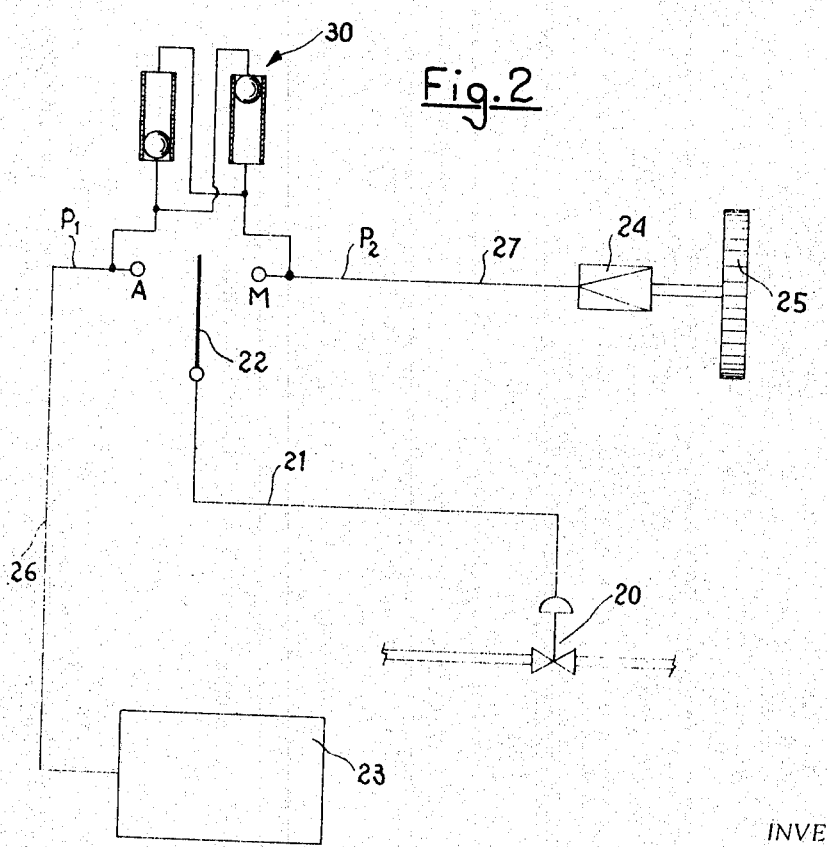

The indicator according to the invention, which obviate the above stated drawbacks, can be advantageously utilized in the switching circuit as shown in FIG. 2. Such circuit is adapted to switch, e.g. from the automatic regulation position to the hand regulation position, a component by which a given physical quantity is regulated, which physical quantity may be e.g. a flow delivery, a pressure, a temperature or the like. The regulating component consists of a valve 20 that is connected by the pipe 21 with a two-way diverter 22 at the inlets A and M of which are fed the pneumatic signals, respectively coming from an automatic regulator 23 and from a pressure reducer 24, that is manually controlled by means of the knob 25. The pneumatic signals having respectively the pressures P1 and P2 are applied to inlets A and M through the pipes 26 and 27.

In order to switch the diverter 22 from the automatic regulation position A to the manual regulation position M, or vice-versa, without change of the signal coming to the valve 20, the two signals as applied to the inlets of the diverter 22 are to be balanced before such switching. A check of the balancing condition can be advantageously performed by means of the indicator 30 according to this invention, which is connected as shown in the figure. Owing to the sensitivity of the indicator, there is the possibility of performing the switching without causing any change in the signal coming to the valve 20.

The indicator according to the invention, being mainly adapted to signal the optimum transfer condition of a regulating circuit from the automatic to the manual control position and vice-versa, may be more properly defined as "transfer indicator."

Figure 3:
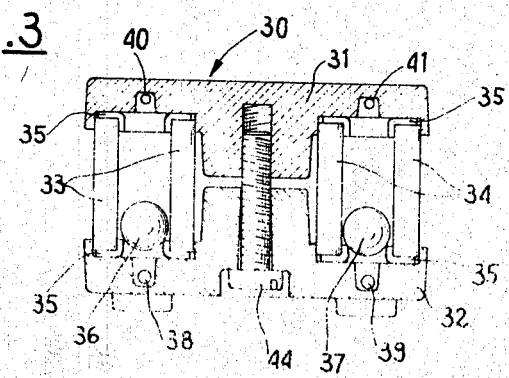
FIG. 3 is a cross-sectional view of a first embodiment of the indicator according to the invention.
Figure 4:
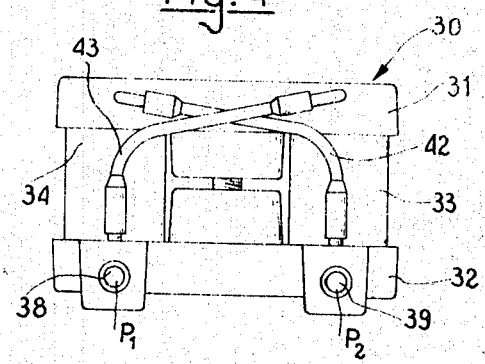
FIG. 4 is a rear view of the indicator shown in FIG. 3.

The structural features of said indicator 30 are shown in more detail in FIGS. 3 and 4. As can be seen in these figures, the indicator substantially consists of a top body 31 and of a bottom body 32, between which calibrated hollow cylinders 33 and 34, made of high strength glass or of another suitable material, are fitted. The two cylinders 33 and 34 are retained in suitable seats expressly formed on the bodies 31 and 32, with a pneumatic seal between the cylinders and seats ensured by suitable gaskets 35. Two balls 36 and 37, having an outer diameter practically equal to the inside diameter of the cylinders 33 and 34, are slidingly fitted inside of these cylinders. Such balls, while being axially movable within the related cylinders, ensure however an airtight seal between the upper and lower sections of the cylinders, as defined by the balls.

As respectively indicated by the reference numerals 38, 39, 40 and 41, pipe ducts are formed in the top and bottom bodies 31 and 32, and such ducts are connected as shown in the circuit of FIG. 2 and more particularly in the rear view of FIG. 4. According to FIG. 4, the ducts 38 and 39 are connected with the pipes feeding, respectively, the signals P1 and P2, while the ducts 40 and 41 are fed with the signals P2 and P1 respectively, through the respective connection means 42 and 43, in such a manner that the two pneumatic signals P1 and P2, as applied to the indicator, will act on opposite sides of balls 36 and 37 slidingly fitted within the cylinders 33 and 34. These latter cylinders are fastened and maintained in a vertical position between the two bodies 31 and 32 by the set screw 44.

From the above, the operation of the described device will be apparent and is substantially as follows. When the pressure levels of the signals P1 and P2, as applied to inlets 38 and 39, are equal with each other, then no pressure differential will act on the opposite sides of balls 36 and 37, which, due to their own weight, are kept at a rest position on the cylinder bottoms, thereby indicating that a balanced condition of signals exists. If instead the pressure level of one signal is higher than that of the other one, a pressure differential will act on opposite sides of the balls. Owing to stated connections, the exposed ball surfaces will be acted upon by the pressure differential in such a manner as to cause an upwardly directed force on one ball, and a downwardly directed force on the other ball. When the upwardly directed force is equal to or higher than the gravity force acting on the ball, then this latter is in an unbalanced condition and will be lifted upwards until encountering the gasket fitted in the cylinder top.

The above condition which—as all other ones—can be detected both visually and by magnetic or other suitable means, corresponds to an unbalance condition of the two pressure signals that are applied to the indicator. The ball which is lifted indicates also the direction in which the regulator control is to be adjusted to reset the balance condition in the indicator, and thus also in the circuit, before the previously stated switching can be performed.

The above detection can be made more easy e.g. by having different indices suitably located on the indicator cylinders. It is to be pointed out that both indicator bodies, as well as the cylinders and the balls, may be made of any material which is suitable for the stated purposes. Moreover, small cylindric bodies or other similar components adapted to exert the same function may be used instead of the balls 36 and 37.

From the foregoing, it will be apparent that the described and shown instrument, in addition to the advantages ensuing from its small size and simplicity, is wholly non-responsive to the absolute pressure level of the signals, being responsive only to pressure differential thereof. In fact, since both exposed ball surfaces are acted upon by the signals, the action exerted by the pressure in one cylinder is wholly independent from the action exerted in the other cylinder, such action exerted on the same useful area, that coincides, in the considered case, with the cross-sectional area of each ball. Thus, when the pressure level of the two applied signals is changed by the same amount, no motion of balls will ensue even when the balls have different diameters.

The sensitivity of the indicator can be changed by suitably varying the diameter of the balls and that of the cylinders, or the diameter of balls relative to that of the cylinders, or, finally, by selecting ball material having different specific gravities.

FIG. 5 shows a second embodiment of the indicator according to the invention, wherein the cylinders 51 and 52 of indicator 50 are series connected with each other by the duct 53 that extends from the top of one cylinder to the top of the other one, the bottoms of said cylinders being connected, by the pipes 54 and 55, respectively, with the sources of the two signals P1 and P2. In this embodiment, the diameters of balls 56 and 57 are slightly smaller than the inside diameters of the cylinders, whereby, in the duct 53 and in the upper sections of the cylinders, a pressure is established whose value is substantially equal to the arithmetical mean of the two signals P1 and P2. Thus, that ball will be lifted which corresponds to the signal having a pressure valve greater than that of the other one, and thus also greater than the arithmetical means of both signals, while when said signals are equal with each other, identical pressure conditions are present throughout the instrument and the balls 56 and 57 will be kept in their lower rest position by their own weight.

While the invention has been described with some detail, it is to be understood that said description must be taken as an illustrative example only and not limiting the inventive idea. Many changes may be made in the details of constructions and arrangement of parts without departing from the scope of the invention.

We claim:

1. A device for detecting and indicating a difference of pressure level and the direction thereof, in excess of a predetermined minimum difference, between two pneumatic pressure signals, said device comprising, in combination, first and second substantially vertical elongated tubular components of substantially equal and uniform internal cross-sectional area and configuration; first and second inlet means each constructed and arranged for connection with the source of a different respective one of said pneumatic pressure signals; a first pair of duct means respectively connecting said first inlet means to the lower end portion of said first component and to the upper end portion of said second component; a second pair of duct means respectively connecting said second inlet means to the lower end portion of said second component and to the upper end portion of said first component; and first and second bodies, having horizontal cross-sectional areas and configurations to provide an essentially fluid-tight fit within and along said components, located within, and for essentially free lengthwise movement, respectively in said first component and in said second component; said first and second bodies having respective weights such that they are movable upwardly in their respective components only responsive to pressure differences, below and above the body, at least equal to said predetermined minimum difference between said two pneumatic pressure signals; whereby, upon the pressure difference between said inlet means at least equaling said minimum difference, the pressure difference is indicated by upward displacement of one of said bodies to the upper end of this respective component, and the direction of such pressure difference is indicated in accordance with which one of said first and second bodies is displaced upwardly in its associated component.

2. A device, as claimed in claim 1, in which said tubular components are formed of transparent material so that such pressure difference is indicated visually.

3. A device, as claimed in claim 1, in which said tubular components are formed of opaque material; said bodies being formed of magnetically detectable material; and magnetic detector means positioned and arranged to selectively detect and signal which one of said bodies is displaced upwardly responsive to such pressure difference.

4. A device, as claimed in claim 1, in which said tubular components are circular cylinders; said bodies being spherical bodies having diameters substantially equal to the inner diameters of the associated cylindrical components.

5. A device, as claimed in claim 1, in which each of said first and second tubular components has an upper end edge portion and a lower end edge portion; an upper frame element contoured to abut axially on the upper end edge portions of said tubular components; a lower frame element contoured to abut axially on the lower end edge portions of said tubular components; securing means interconnecting said frame elements in axially abutting and fluid-tight relation with said tubular components; ports in said upper and lower frame elements, within the surface areas thereof defined by the abutments of said frame elements on said components; said first and second pairs of duct means including a pair of duct means each respectively connecting that port means in one of said frame elements communicating with one of said tubular components with that port means in the other of said frame elements communicating with the other of said tubular elements; said first and second inlet means comprising respective pipe fitting means connected to the ports in one of said frame elements.

6. A device, as claimed in claim 5, including gasket means interposed between the end edge portions of said tubular components and said frame elements to ensure fluid-tightness between said components and said frame elements and to provide seating means for said tubular components in said frame elements; said gasket means preventing fluid communication between said sources of pneumatic signals even when a difference of pressure exits between said sources.

References Cited

UNITED STATES PATENTS 2,475,585  7/1949  Baird _____ 73—395UX

DONALD O. WOODIEL, Primary Examiner